United States Patent
Wu

(10) Patent No.: US 10,403,138 B2
(45) Date of Patent: Sep. 3, 2019

(54) TRAFFIC ACCIDENT WARNING METHOD AND TRAFFIC ACCIDENT WARNING APPARATUS

(71) Applicant: Tencent Technology (Shenzhen) Company Limited, Shenzhen (CN)

(72) Inventor: Yifan Wu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/046,716

(22) Filed: Jul. 26, 2018

(65) Prior Publication Data

US 2018/0330610 A1    Nov. 15, 2018

Related U.S. Application Data

(63) Continuation-in-part of application No. PCT/CN2017/083762, filed on May 10, 2017.

(30) Foreign Application Priority Data

May 10, 2016 (CN) .......................... 2016 1 0308302

(51) Int. Cl.
*G08G 1/0967* (2006.01)
*H04N 7/18* (2006.01)
(Continued)

(52) U.S. Cl.
CPC ....... *G08G 1/0967* (2013.01); *G06K 9/00718* (2013.01); *G06K 9/00791* (2013.01);
(Continued)

(58) Field of Classification Search
CPC .................................................. G08G 1/0967
See application file for complete search history.

(56) References Cited

U.S. PATENT DOCUMENTS

2014/0300690 A1    10/2014    Hong et al.

FOREIGN PATENT DOCUMENTS

CN    102157069 A    8/2011
CN    103236158 A    8/2013
(Continued)

OTHER PUBLICATIONS

Tencent Technology, ISRWO, PCT/CN2017/083762, Jun. 29, 2017, 6 pgs.

(Continued)

*Primary Examiner* — Girumsew Wendmagegn
(74) *Attorney, Agent, or Firm* — Morgan, Lewis & Bockius LLP

(57) ABSTRACT

This application discloses a traffic accident warning method performed by a computing device. After obtaining location data of a first vehicle and a second vehicle respectively, and videos captured by a first video camera onboard the first vehicle and a second video camera onboard the second vehicle, the computing device generates traffic scenes based on the road status data, the vehicle motion data, the pedestrian motion data obtained from the videos, and broadcasted traffic data, and then generates traffic accident models based on past traffic accidents, synthesizes a simulation video including one or more target features based on the traffic scenes and the traffic accident models at a target area associated with the target features. Finally, the computing device performs traffic accident prediction based on the simulation videos and sends warning information to the first vehicle in accordance with a determination that the first vehicle is about have an accident in the target area.

20 Claims, 11 Drawing Sheets

(51) Int. Cl.
  *G06K 9/00*      (2006.01)
  *G08G 1/01*      (2006.01)
  *G11B 27/031*    (2006.01)
  *G11B 27/30*     (2006.01)
  *G11B 27/34*     (2006.01)
  *H04N 5/232*     (2006.01)
  *G08G 1/16*      (2006.01)
(52) U.S. Cl.
  CPC ........... *G08G 1/0112* (2013.01); *G08G 1/162* (2013.01); *G08G 1/163* (2013.01); *G08G 1/164* (2013.01); *G08G 1/166* (2013.01); *G11B 27/031* (2013.01); *G11B 27/3081* (2013.01); *G11B 27/34* (2013.01); *H04N 5/232* (2013.01); *H04N 5/23238* (2013.01); *H04N 7/18* (2013.01); *H04N 7/181* (2013.01)

(56) References Cited

FOREIGN PATENT DOCUMENTS

| CN | 103985254 A | 8/2014 |
| CN | 105407278 A | 3/2016 |
| CN | 105761500 A | 7/2016 |

OTHER PUBLICATIONS

Tencent Technology, IPRP, PCT/CN2017/083762, Nov. 13, 2018, 5 pgs.

TRAFFIC ACCIDENT WARNING METHOD AND TRAFFIC ACCIDENT WARNING APPARATUS

PRIORITY CLAIM AND RELATED APPLICATION

This application is a continuation-in-part application of PCT/CN2017/083762, entitled "TRAFFIC ACCIDENT PRE-WARNING METHOD AND TRAFFIC ACCIDENT PRE-WARNING APPARATUS" filed on May 10, 2017, which claims priority to Chinese Patent Application No. 201610308302.4, entitled "TRAFFIC ACCIDENT PROCESSING METHOD AND TRAFFIC ACCIDENT PROCESSING APPARATUS" filed with the Chinese Patent Office on May 10, 2016, all of which are incorporated herein by reference in their entirety.

FIELD OF THE TECHNOLOGY

This application relates to a traffic monitoring and warning technology of the communications field, and in particular, to a traffic accident warning method and a traffic accident warning apparatus.

BACKGROUND OF THE DISCLOSURE

Vehicles already become indispensable transportation tools. When there are many vehicles and the road condition is complex, there is a need to take measures to ensure driving safety.

Currently, various forms of terminals are usually installed in the vehicles, such as a navigating device, used to prompt information of a currently driving road. For example, the navigating device prompts the vehicles of speed limit information of the currently driving road, traffic condition such as congestion, and whether the current road is a road with frequent accidents, so as to prompt drivers to pay attention to driving safety.

However, environment around the currently driving road of the vehicles and status of the vehicles on the driving road such as numbers and speeds of the vehicles around the vehicle is dynamic, changeable, and complex. In addition, the drivers usually cannot accurately control current driving due to blind spots of the vehicle, especially in a case in which the vehicles are at a cross section with heavy traffic and the road is in bad condition, for example, the road is broken (e.g., potholes, cracks, sags and humps, etc.) or there are obstacles and/or pedestrians.

SUMMARY

Embodiments of this application provide a traffic accident warning method and a traffic accident warning apparatus.

According to a first aspect, an embodiment of this application provides a traffic accident warning method. The method is performed at a computing device having one or more processors and memory storing a plurality of programs to be executed by the one or more processors. The computing device obtains (1) location data of a first vehicle and a second vehicle respectively, and (2) videos captured by a first video camera onboard the first vehicle and a second video camera onboard the second vehicle as the first vehicle and the second vehicle move on a road, wherein a respective video comprises a plurality of video frames captured during a time period. The computing device processes the captured videos to obtain (a) road status data (b) vehicle motion data of one or more vehicles and (c) pedestrian motion data of one or more pedestrians present within fields of view of the first and second video cameras at respective time points within the time period. The computing device generates one or more traffic scenes associated with one or more areas including the first and second vehicles on the road within the time period, wherein a traffic scene of a respective area includes video data synthesized based on the road status data, the vehicle motion data, the pedestrian motion data, and broadcasted traffic data associated with the respective area and from a plurality of viewing angles. The computing device generates one or more traffic accident models based on past traffic accidents and (a) road status data (b) vehicle motion data and (c) pedestrian motion data associated with the past traffic accidents. The computing device synthesizes a simulation video including one or more target features based on the traffic scenes and the traffic accident models at a target area associated with the target features, wherein the one or more target features are extracted from the (a) road status data (b) vehicle motion data and (c) pedestrian motion data from the captured videos. The computing device performs traffic accident prediction based on the simulation videos and sending warning information to the first vehicle in accordance with a determination that the first vehicle is about have an accident in the target area.

A second aspect of the present disclosure provides a computing device for generating traffic accident warnings, the computing device having one or more processors and memory storing a plurality of programs, wherein the plurality of programs, when executed by the one or more processors, cause the risk assessment computing device to perform the aforementioned method.

A third aspect of the present disclosure provides a non-transitory computer readable storage medium storing a plurality of programs in connection with a computing device for generating traffic accident warnings having one or more processors, wherein the plurality of programs, when executed by the one or more processors, cause the computing device to perform the afore mentioned method.

In the embodiments of this application, the panoramic video of the target area is synthesized by obtaining real-time videos at the locations of a plurality of vehicles in the target area, and a real-time traffic scene of the target area is determined based on the panoramic video, so as to performing traffic accident prediction for the traffic scene of the target area by using a traffic accident model, thereby ensuring to warn related vehicles before the traffic accident happens, thus avoiding the traffic accident. The traffic accident prediction is aimed at an actual traffic scene (that is, a driving condition) of the vehicles in the target area, which is well-targeted and accurate, apparently reducing the risk of the traffic accident.

BRIEF DESCRIPTION OF THE DRAWINGS

To describe the technical solutions in the embodiments of this application or in the prior art more clearly, the following briefly introduces the accompanying drawings required for describing the embodiments or the prior art. Apparently, the accompanying drawings in the following description show merely the embodiments of this application, and a person of ordinary skill in the art may still derive other drawings from these accompanying drawings without creative efforts.

DESCRIPTION OF EMBODIMENTS

The following further describes this application in detail with reference to the accompanying drawings and the embodiments. It should be understood that the embodiments provided herein are merely used to explain this application but are not intended to limit this application. In addition, the following provided embodiments are intended to implement part embodiments of this application, not all embodiments of this application. Embodiments obtained by recombining technical solutions of the following embodiments and other embodiments implemented based on this application by a person skilled in the art without creative efforts shall fall within the protection scope of this application.

It should be noted that the terms "include", "comprise", or any other variation thereof in the embodiments of this application are intended to cover a non-exclusive inclusion, so that methods or apparatuses including a series of elements not only include specifically recorded elements, but include other elements not specifically listed, or further include elements intrinsic to implementations or apparatuses. Without more limitations, an element limited by a sentence "include one . . . " does not exclude that methods or apparatuses including the element have another related element (for example, steps in the methods or units in the apparatuses). For example, a traffic accident warning method provided in the embodiments of this application includes a series of steps. However, the traffic accident warning method provided in the embodiments of this application is not limited to the recorded steps. Similarly, a traffic accident warning apparatus provided in the embodiments of this application includes a series of units. However, the traffic accident warning apparatus provided in the embodiments of this application is not limited to including the specifically recorded units, but may further include units disposed to obtain related information or process based on the information.

The embodiments of this application provide a traffic accident warning method to implement well-targeted traffic accident warning to vehicles. The traffic accident warning method provided in the embodiments of this application may be applied to a traffic accident warning apparatus. The traffic accident warning apparatus may be implemented in various manners. The following gives exemplary descriptions on different implementations of the traffic accident warning apparatus.

Figure 1:
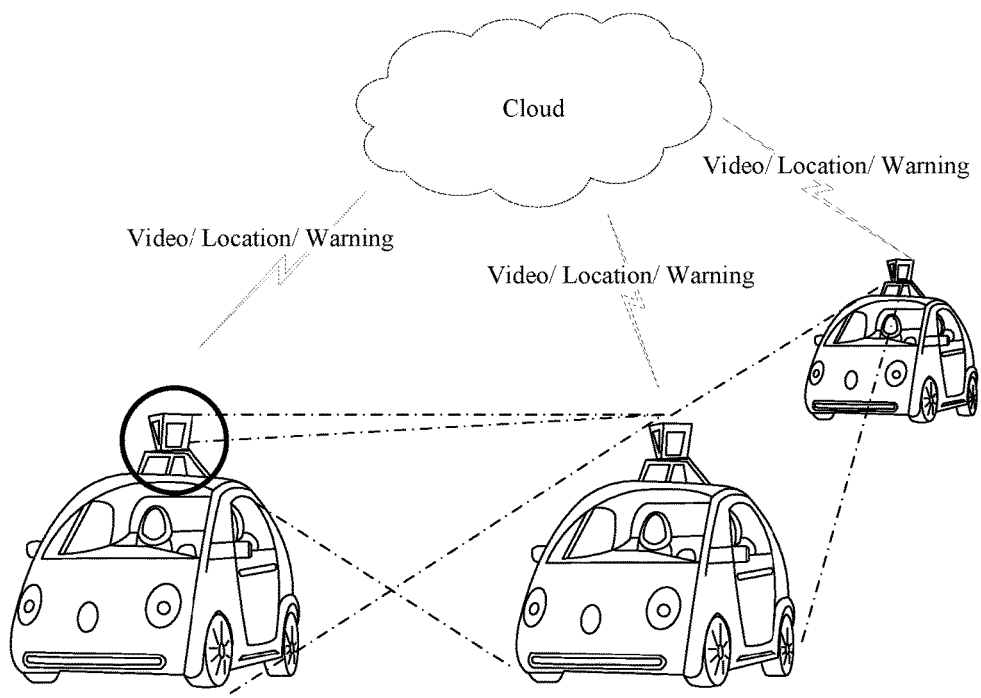
FIG. 1 is a schematic scene diagram of using a traffic accident warning apparatus to perform traffic accident warning according to an embodiment of this application.

A first implementation of the traffic accident warning method and apparatus refers to an optional schematic scene diagram of using a traffic accident warning apparatus to perform traffic accident warning shown in FIG. 1. To save computing resources and storage resources of a mobile terminal, in the traffic accident warning apparatus provided in the embodiments of this application, each functional unit may be distributed and implemented at a mobile terminal and a cloud (the cloud is provided with one or more servers according to needs) in vehicles. Mobile terminals in a target area position vehicles of the mobile terminal, capture a video at locations of the vehicles, and send the locations of the vehicles obtained in real time and the video to the cloud, so that the cloud performs traffic accident prediction and warning to the target area based on a real-time location of the vehicles and the locations of the vehicles.

Figure 2:
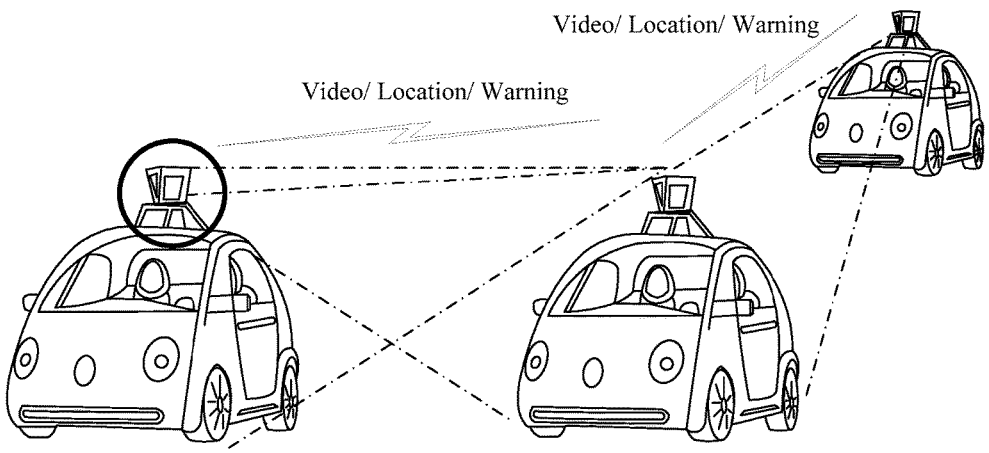
FIG. 2 is a schematic scene diagram of using a traffic accident warning apparatus to perform traffic accident warning according to another embodiment of this application.

A second implementation of the traffic accident warning apparatus refers to an optional schematic scene diagram of using a traffic accident warning apparatus to perform traffic accident warning shown in FIG. 2. In a case in which computing resources and storage resources of a mobile terminal is sufficient to use, a functional unit of the traffic accident warning apparatus may be implemented at a mobile terminal side in vehicles. Mobile terminals in a target area send to each other a real-time location of the vehicles disposed with the mobile terminal and a captured video at locations of the vehicles. The mobile terminals (each mobile terminal or part of the mobile terminals) perform traffic accident warning to the target area based on the real-time location of the vehicles and the video of the locations of the vehicles. The mobile terminal may be implemented as a terminal device such as an intelligent phone and a tablet, or implemented as a mobile terminal in other forms, such as a laptop, which is not limited in the embodiments of this application.

Figure 3:
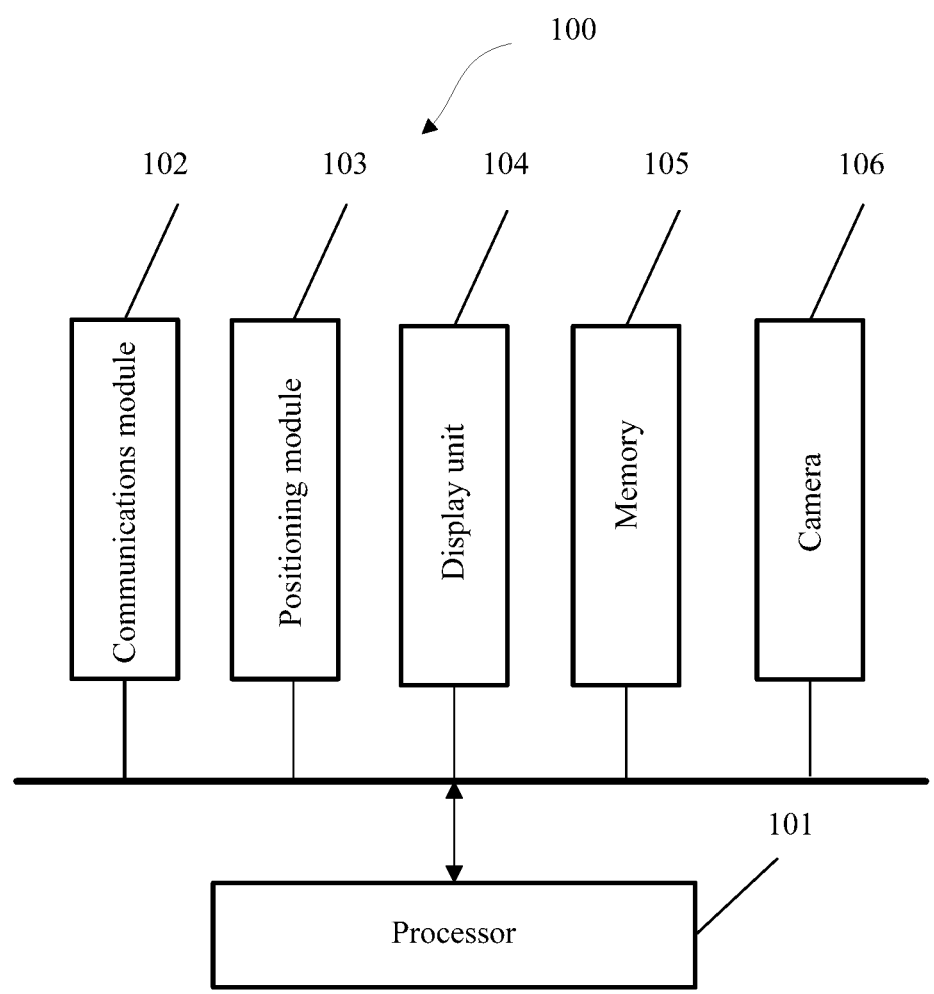
FIG. 3 is a schematic diagram of a hardware structure of a traffic accident warning apparatus of a mobile terminal according to an embodiment of this application.

FIG. 3 shows an exemplary schematic diagram of an optional hardware structure of the foregoing mobile terminal, particularly an in-vehicle mobile terminal, including basic hardware modules, such as a processor 101, a communications module 102, a memory 105, a positioning module 103, and the like. Certainly, the mobile terminal can implement less or more hardware modules compared with FIG. 3. The following takes examples to describe.

For example, the hardware structure of the mobile terminal may not include the memory, a display unit, and a camera, but may use a digital interface, such as a universal serial bus (USB) interface, a serial advanced technology attachment (SATA) interface, a peripheral component interconnect (PCI) interface, an advanced PCI interface, and the like, to connect to external storage apparatuses, such as a flash memory, an optical disc, and a hard disk to store data, or use a cloud to store data by using the communications module.

Similarly, the mobile terminal may use the external display unit to display a processing process or a processing result of information. Optionally, the display unit is merely configured to support display of the information, or to build in a touch component to support a touch operation, which is not limited in the embodiments of this application. Similarly, the mobile terminal may use the external camera to capture a video. The mobile terminal and the external camera are connected in a wired or wireless manner to control the camera to capture the video and receive the video captured by the camera.

For another example, the mobile terminal may further implement a microphone to output voice and implement various sensors to assist and control the mobile terminal according to actual needs.

The following further describes the hardware structure of the mobile terminal shown in FIG. 3. The processor 101 is configured to execute executable instructions stored in the memory 105 (a single manner is used to process data and a data processing result is displayed by the display unit, and the foregoing method is used to implement the traffic accident warning method provided in the embodiments of this application.

The memory 105 shown in FIG. 3 is configured to store the executable instructions to be executed by the processor 101, a middle result and a final result of processing data by the processor 101, and data obtained from an external device, so that the processor implements the traffic accident warning method provided in the embodiments of this application. For example, the memory 105 can use a volatile storage medium such as a random access memory (RAM) to store the middle processing result of the data. The memory can use a non-volatile storage medium, for example, a storage apparatus based on magnetic storage such as a mechanic hard disk and a magnetic tape, a storage apparatus based on a flash memory such as solid state drives (SSD), or any other form of storage apparatus based on the flash memory.

The communications module 102 shown in FIG. 3 is configured to support communication of the mobile terminal. For example, the communications module 102 may be implemented as a cellular communications module to support the mobile terminal to access into a communication network to perform mobile communication. A communications standard supported by the communications module may be code division multiple access (CDMA), wideband code division multiple access (WCDMA), time division-synchronous code division multiple access (TD-SCDMA), and an evolved standard of the TD-SCDMA, which is not limited in the embodiments of this application. For another example, the communications module may be implemented as a communications module based on various short-distance communication technologies, such as wireless fidelity authentication (WiFi), Bluetooth, ZigBee, and the like.

The camera shown in FIG. 3 is used to capture the video to form the video. For example, the camera can use one lens or more lenses to form a lens array, so as to enlarge a view angle of video capturing. Optionally, the captured videos may have any form such as a transport stream (TS) and a program stream (PS), so that the communications module is transmitted by using the communication network.

The positioning module shown in FIG. 3 may be implemented as a positioning module based on a global positioning system (GPS). The mobile terminal is positioned by receiving a GPS signal to output location information and speed information of the mobile terminal. Alternatively, the positioning module may be implemented as a module based on other satellite positioning system, such as a positioning module based on a Chinese BeiDou satellite positioning system, a positioning module based on a Russian GLONASS global positioning system, a positioning module based on an European Galileo global positioning system, and the like.

Figure 4A:
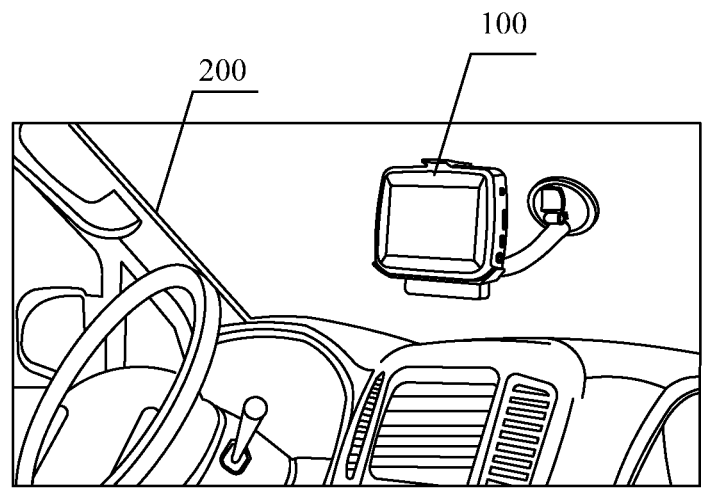
FIG. 4A is a schematic diagram of an in-vehicle mobile terminal according to an embodiment of this application.

Particularly, in an embodiment, the traffic accident warning apparatus is implemented as an in-vehicle mobile terminal fixedly disposed inside the vehicles. For example, refer to an optional schematic diagram of an in-vehicle mobile terminal 100 disposed inside a vehicle 200 shown in FIG. 4A. The in-vehicle mobile terminal can be fixedly disposed in a front panel of the vehicle. Certainly, refer to another optional schematic diagram of an in-vehicle mobile terminal 100 disposed inside a vehicle 200 shown in FIG. 4A. The in-vehicle mobile terminal may further be any locations of the vehicles that can be fixedly disposed. The embodiments of this application do not specifically limit a form of the in-vehicle mobile terminal and the disposed locations.

The following further describes the in-vehicle mobile terminal. The in-vehicle mobile terminal has a basic in-vehicle navigation function, for example, positioning a current location of the vehicle, calculating a feasible navigation route according to a destination indicated by a driver with reference to map data (maintained at the in-vehicle mobile terminal or at a cloud), starting navigation according to the navigation route selected by the driver or selected automatically, prompting a driving status of the vehicle (for example, a route or a speed), prompting the driver to correct a driving route when the vehicle deviates a set navigation route, and recalculating the navigation route and further performing navigation when a preset condition is satisfied, for example, when the vehicle deviates a preset distance of the set navigation route or the driver determines to further drive the vehicle along a current road automatically ending navigation when the vehicle deviates the set navigation rout.

Figure 5:
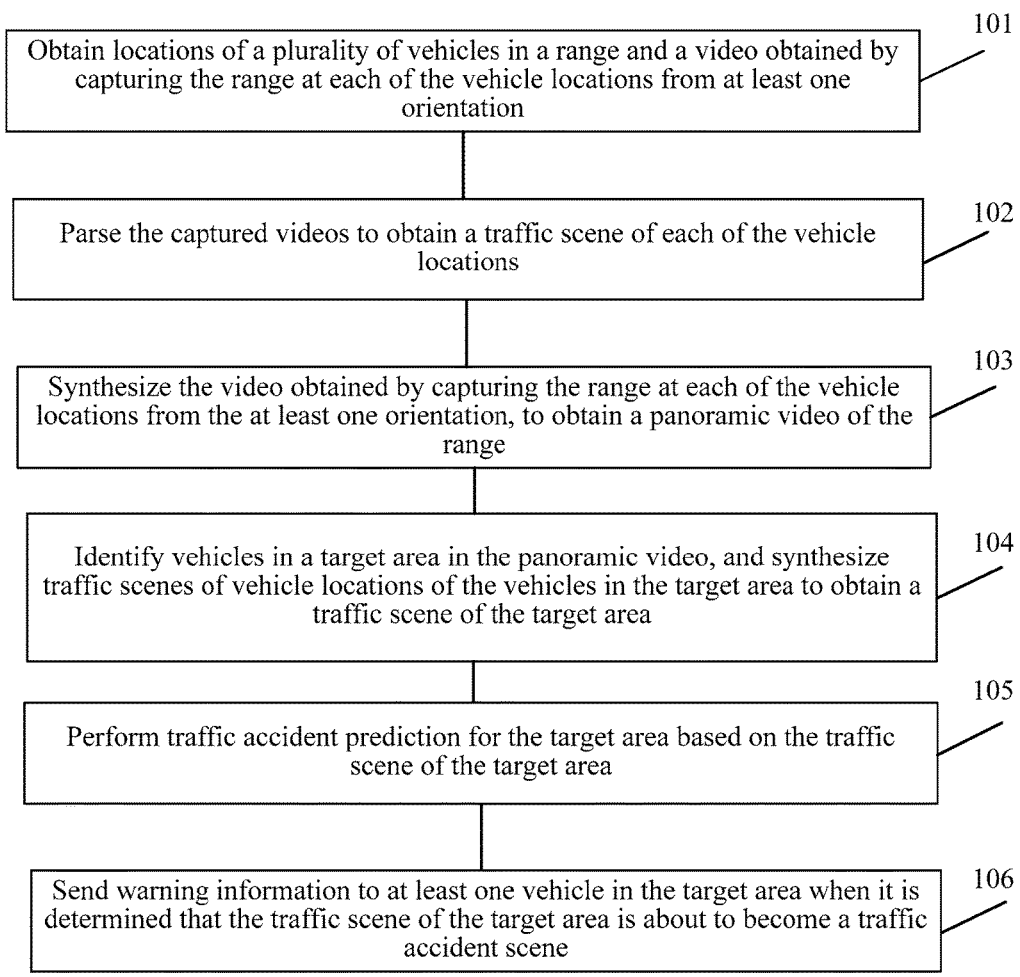
FIG. 5 is a schematic flowchart of a traffic accident warning method according to an embodiment of this application.

FIG. 5 shows a schematic flowchart of a traffic accident warning method according to an embodiment of this application, including the following steps:

101: Obtain locations of a plurality of vehicles in a target area and a video obtained by capturing the target area at each of the vehicle locations from at least one orientation.

102: Process (e.g., parsing) the captured videos to obtain a traffic scene of each of the vehicle locations.

103: Synthesize the video obtained by capturing the target area at each of the vehicle locations from the at least one orientation, to obtain a panoramic video of the target area.

104: Identify vehicles in a target area in the panoramic video, and synthesize traffic scenes of vehicle locations of the vehicles in the target area to obtain a traffic scene of the target area.

105: Perform traffic accident prediction for the target area based on the traffic scene of the target area.

106: Send warning information to at least one vehicle in the target area when it is determined that the traffic scene of the target area is about to become a traffic accident scene.

In an implementation, the foregoing traffic accident warning method is executed by a cloud. The obtaining locations of a plurality of vehicles in a target area and a video obtained by capturing the target area at each of the vehicle locations from at least one orientation includes: receiving the vehicle locations sent by a mobile terminal disposed on each vehicle and the captured videos.

In another implementation, the foregoing traffic accident warning method is executed by the mobile terminal on the vehicle. The obtaining locations of a plurality of vehicles in a target area and a video obtained by capturing the target area at each of the vehicle locations from at least one orientation includes: positioning, by the mobile terminal, the vehicle locations and capturing videos.

The following refers to FIG. 6 to FIG. 11 to describe traffic accident processing in a target area when a traffic accident warning apparatus is distributed and implemented at a cloud and a mobile terminal. Traffic accident warning in multiple target areas may be implemented with reference to the following recorded technical solutions.

The target area recorded in the embodiments of this application refers to a basic area of performing traffic accident warning. For example, the target area may be a road, multiple neighboring roads, a cross road, a city area, or a city. Alternatively, the target area may be a geographic area in a particular geometric shape, for example, a series of target areas are obtained by dividing all geographic areas of traffic accident warning into a square or a rectangle. Certainly, the target area can be set to have a larger or smaller target area than an example of the foregoing target area. The size of the target area is set according to the granularity of performing traffic accident processing in different geographic target areas and a processing ability of the cloud or the mobile terminal.

Figure 6:
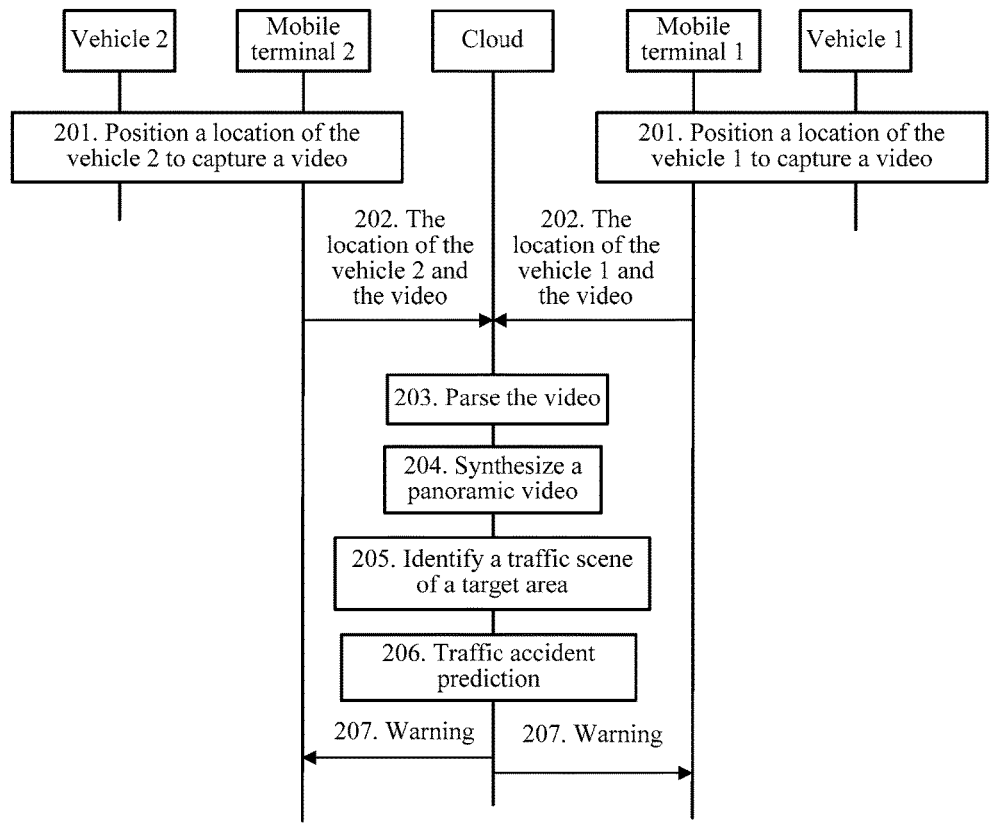
FIG. 6 is a schematic flowchart of a traffic accident warning method according to an embodiment of this application.
Figure 7:
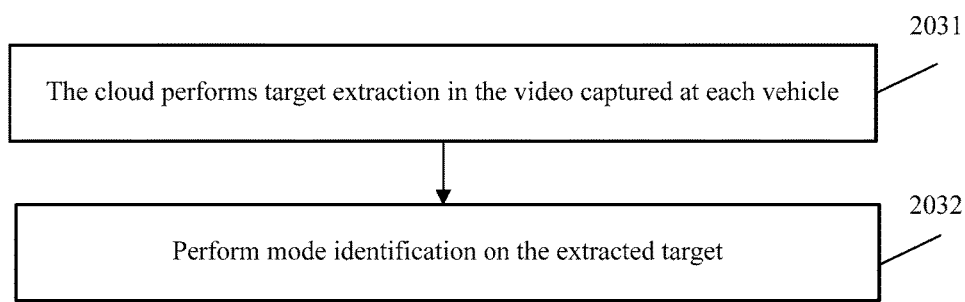
FIG. 7 is a schematic flowchart of an implementation of step 203 in FIG. 6 according to an embodiment of this application.
Figure 8:
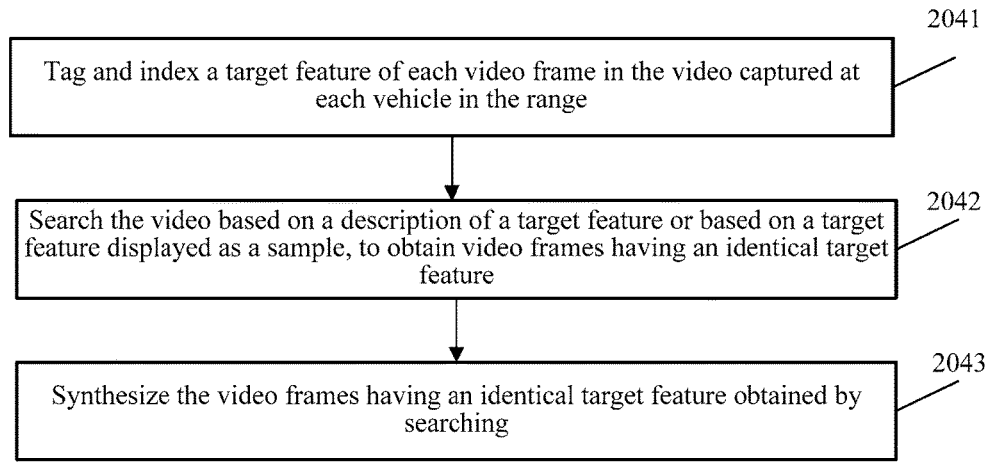
FIG. 8 is a schematic flowchart of an implementation of step 204 in FIG. 6 according to an embodiment of this application.

FIG. 6 is a schematic flowchart of a traffic accident warning method provided according to an embodiment of this application, including step 201 to step 207. The following describes with reference to steps:

Step 201: Each mobile terminal in a target area positions vehicle locations and videos are obtained by capturing the vehicle locations in the target area from at least one orientation.

In an implementation, mobile terminals disposed in vehicles position the vehicle locations by using a positioning module. For example, the vehicle locations may be obtained by using the positioning module to output an original geographic coordinate, for example, a longitude and latitude coordinate, a spherical coordinate, or a plane two-dimensional coordinate.

For another example, the vehicle locations use the original geographic coordinate. Further, for ease of identifying and processing the vehicle locations in the target area, a square coordinate may further be used. The original coordinate of the vehicle locations is converted to be the square coordinate in the target area, so as to use the square coordinate to identify the vehicle locations in the target area. The square coordinate is obtained by using a geographic square of a preset granularity to divide the target area. The area of the geographic square is inversely proportional to the precision of the square coordinate, for example, the smaller the area of the geographic square is, the larger the precision of the vehicle locations of square coordinate characterization obtained by dividing the target area is.

Optionally, when the vehicle locations use the square coordinate to divide different target areas, the size of the geographic square is same Alternatively, when different target areas are divided, the size of the geographic square is inversely proportional to vehicle traffic in the target area, that is, the heavier the vehicle traffic in the target area is, the busier traffic in the target area is. Therefore, a target area in which traffic is relatively light, a smaller geographic square is used to divide the target area, so as to avoid a problem that the target area in which traffic is relatively light uses a same geographic square to divide, leading to large consumption of computing resources at a cloud.

In an implementation, the mobile terminal uses a camera to capture videos in the target area at a location of the mobile terminal by fixing an orientation. A number of the used camera is at least one. Certainly, the number of the used camera may be multiple, so as to form a capturing mode of a wide view angle. Particularly, the camera can be disposed at a top of the vehicle, so as to enlarge the captured view angle to the largest degree.

In another implementation, the mobile terminal uses the camera to capture videos by changing the orientation, so as to form a capturing mode of a full view angle. Particularly, a dynamic target having a preset distance (for example, ten meters) with the vehicle in the target area is usually a potential target leading to a traffic accident. Accordingly, the dynamic target is set as a first capturing object. The camera is used to track and capture the dynamic target (for example, a driving car or pedestrian) having the preset distance with the vehicle in the target area. The mobile terminal uses a binocular camera positioning technology to determine a distance between the vehicle and the dynamic target, or the mobile terminal uses a deep camera to detect the distance between the dynamic target and the vehicle.

Step 202: Each mobile terminal in the target area sends the vehicle locations and the captured videos to a cloud.

In an implementation, given that the mobile terminal uses a mobile communication manner to send the captured videos to the cloud, to reduce time delay of video transmission due to a limited transmission rate of a mobile communication link and ensure real-time of processing the videos by the cloud, the mobile terminal uses a video compressing technology to compress the captured videos and transfer the captured videos to the cloud.

Step 203: The cloud processes the captured videos to obtain a traffic scene of each of the vehicle locations in the target area.

The traffic scene of the vehicle locations refers to a traffic status centering the vehicle of a target area using a valid capturing distance of the camera disposed at the vehicle as a radius. In an implementation, refer to a schematic flowchart of a traffic scene of each of the vehicle locations in the target area obtained by processing the captured videos by the cloud shown in FIG. 7, including step 2031 to step 2032. The following describes the steps.

Step 2031: The cloud performs target extraction in the video captured at each vehicle.

The cloud uses a target extraction technology, for example, a currently used frame subtraction, a background subtraction, and the like. The target is extracted from each video frame of the videos and the target is classified, for example, a static target and a dynamic target, which is added to the video locations when capturing the videos to obtain the captured target at corresponding video locations. For example, the static target includes: various forms of traffic signs such as a road, a building, a traffic light, a road sign, a road lane, a crossroad bridge, a pole, and the like. The dynamic target includes: a vehicle, pedestrian, and any target in a running state.

Step 2032: Perform mode identification on the extracted target to obtain at least one of the following features: a road scene of the road, a behavior type of the pedestrian, a behavior type of the vehicle, and a status of the traffic sign.

For example, the road scene includes: 1) a section sign of the road, for example, xx section of Shennan avenue; 2) a status of the road, including a normal road, a wet road, a broken road, and a limited road, for example, xx section of Keyuan south road is in construction, crowded, or sank; 3) the behavior type of the pedestrian includes: traversing the road and waiting at a side of the road; 4) the behavior type of the vehicle includes: speed exceeding, lane changing, retrograding, and urgent braking; 5) the status of the traffic sign, take the traffic light as an example, the status includes a red light, a green light, and a yellow light.

Step 204: Synthesize the video obtained by capturing the target area at each vehicle from the at least one orientation in the target area, to obtain a panoramic video of the target area.

The panoramic video is synthesized by jointing videos captured at a same moment by each vehicle in the target area, so as to form a video in which the target area can be watched from all orientations. In an implementation, refer to a schematic flowchart of synthesizing a panoramic video shown in FIG. 8, including step 2041 to step 2043. The following describes with reference to steps:

Step 2041: Tag and index a target feature of each video frame in the video captured at each vehicle in the target area.

The target feature is obtained by performing feature extraction on the target extracted from the video in the foregoing step 2031. For example, the feature can be a color feature, a profile feature, a vein feature, a feature that can distinguish the target from any other targets around in the video frame. Different features are indexed by using descriptions of the target feature or a sample image of the target. The descriptions of the target feature can use an identifier (for example, a number) or a feature vector manner to index (a dimensional component of the feature vector is used to represent a type of feature of the target).

Step 2042: Search the video based on a description of a target feature or based on a target feature displayed as a sample, to obtain video frames having an identical target feature.

For the video captured at a same moment by each mobile terminal in the target area, each tagged and indexed target feature is searched in sequence in each video frame of the video to determine that the video has the video frames having an identical target feature. A same target in the target area is captured, so that there are the video frames having an identical target feature. A potential connection relationship between each video frame can be determined by determining all video frames having an identical target feature.

For example, it is assumed that video 1 includes video frame 1, video frame 2, and video frame 3. Video 2 includes video frame 4, video frame 5, and video frame 6. If target feature 1 is extracted from the video frame 1, the target feature 1 is extracted from the video frame 2, the target feature 1 and target feature 2 are extracted from the video frame 3, the target feature 2 is extracted from the video frame 4, the target feature 2 and target feature 3 are extracted from the video frame 5, and the target feature 3 is extracted from the video frame 6, the video frame 1 and the video frame 2 have a same target feature 1, the video frame 2 and the video frame 3 have a same target feature 1, the video frame 3 and the video frame 4 have a same target feature 2, the video frame 4 and the video frame 5 have a same target feature 2, and the video frame 5 and the video frame 6 have a same target feature 3. Therefore, the video frame 1 to the video frame 6 are obtained by constantly capturing an area in the target area. An area corresponding to the video 1 to the video 6 in the target area is connected in sequence. A potential connection relationship from the video 1 to the video 6 is shown in table 1.

TABLE 1

| | video frame 1 | video frame 2 | video frame 3 | video frame 4 | video frame 5 | video frame 6 |
|---|---|---|---|---|---|---|
| video frame 1 | \ | target feature 1 | \ | \ | \ | \ |
| video frame 2 | \ | \ | target feature 1 | \ | \ | \ |
| video frame 3 | \ | \ | \ | target feature 2 | \ | \ |
| video frame 4 | \ | \ | \ | \ | target feature 2 | \ |
| video frame 5 | \ | \ | \ | \ | \ | target feature 3 |

It needs to be noted that the orientation captured by using the camera cannot be completely same because of different mobile terminals. Therefore, a same target may be different in different videos captured in a mobile manner. Therefore, optionally, when searching each tagged and indexed target feature in sequence in each video frame of the video, the target feature and geometric formation (for example, rotating and extending) of the target feature are matched with the target feature of each video frame of the video, if matches, it is determined that successfully matched video frames have a same target feature.

Step 2043: Synthesize the video frames having an identical target feature obtained by searching.

In an implementation, for the video frames having an identical target feature, the video frames are jointed according to the identical target feature until all video frames are jointed to form a panoramic video frame of the target area.

For example, the following further describes examples of the video frame 1 to the video frame 6. The connection relationship between the video frame 1 to the video frame 6 based on the target feature is as follows: the video frame 1–(the target feature 1)>the video frame 2–(the target feature 1)>the video frame 3–(the target feature 2)>the video frame 4–(the target feature 2)>the video frame 5–(the target feature 3)>the video frame 6. The video frame 1 and the video frame 2 are jointed and synthesized based on the target feature 1. The video frame 2 and the video frame 3 are jointed and synthesized based on the target feature 1. The video frame 3 and the video frame 4 are jointed and synthesized based on the target feature 2. The video frame 4 and the video frame 5 are jointed and synthesized based on the target feature 2. The video frame 5 and the video frame 6 are jointed and synthesized based on the target feature 3, so as to form the panoramic video jointed and synthesized from the video frame 1 to the video frame 6.

Step 205: Identify vehicles in a target area in the panoramic video, and synthesize traffic scenes of areas of each vehicle in the target area to obtain a traffic scene of the target area.

For a target area, there is a need to perform traffic accident warning to the traffic scene of all areas (accordingly, the target area is a whole area of the target area) of the target area, or there is a need to perform traffic accident warning to a particular area in the target area (accordingly, the particular area is the target area, such as a road with frequent accidents, a road with heavy traffic, or a crossroad). To warn the target area, there is a need to obtain an integrated traffic scene of the target area, which is already determined in the foregoing step 203 based on the traffic scene of each vehicle location in the target area. A video captured at a single vehicle is limited to the capturing orientation. Therefore, the integrated traffic scene of the vehicle locations cannot be determined according to the single vehicle. In this case, in an implementation, vehicles included in the target area are identified from the panoramic video. The traffic scene of the vehicle locations in the target area is integrated to form the integrated traffic scene of the target area.

Use that a target area is a crossroad as an example. The target area includes vehicle 1, vehicle 2, and vehicle 3. A traffic scene corresponding to a video captured by the vehicle 1 to the vehicle 3 is shown in table 2.

TABLE 2

|  | Traffic scene | Vehicle behavior | Pedestrian behavior |
| --- | --- | --- | --- |
| Vehicle 1 | **north road, north is unblocked | Vehicle 3 changes a lane. | No pedestrian |
| Vehicle 2 | **south road, south is bumpy | No other vehicles | Two pedestrian are waiting. |
| Vehicle 3 | **north road, north is unblocked | Vehicle 1 drives to the right. | No pedestrian |

It can be seen from table 2 that it is one-sided to use the traffic scene corresponding to the video captured at any of the vehicle 1 to the vehicle 3 as a traffic scene of the target area, which cannot accurately describe the traffic scene of the target area. A traffic scene obtained by integrating the traffic scene corresponding to the video captured at any of the vehicle 1 to the vehicle 3 is used as the traffic scene of the target area, which can fully describe a traffic condition of the target area.

Step 206: The cloud performs traffic accident prediction to determine whether the traffic scene of the target area will become a traffic accident scene.

Figure 9:
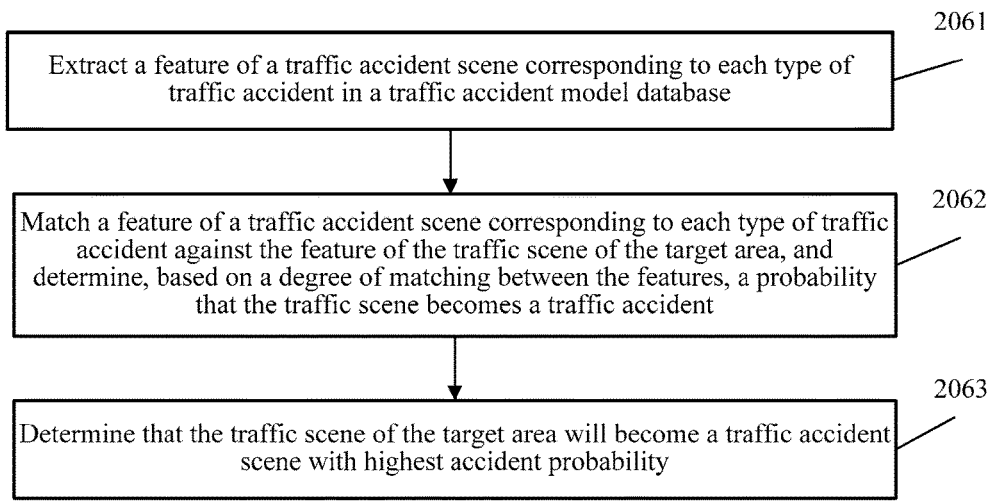
FIG. 9 is a schematic flowchart of an implementation of step 206 in FIG. 6 according to an embodiment of this application.

In an implementation, refer to an optional schematic flowchart of determining whether the traffic scene of the target area will become a traffic accident scene shown in FIG. 9, including step 2061 to step 2063. The following describes the steps.

Step 2061: Extract a feature of a traffic accident scene corresponding to each type of traffic accident in a traffic accident model database, the traffic accident model database including a correspondence between traffic accident scenes and traffic accident types.

In an embodiment, the traffic accident model database maintained by a cloud includes different types of traffic accident models of traffic accidents. The traffic accident modules include a correspondence between traffic accident scenes and corresponding types of traffic accidents. The traffic accident scenes of different traffic accidents include three features: a road scene, a pedestrian behavior, and a vehicle behavior. Certainly, the traffic accident scenes may further include other types of features, for example, an optional example of the traffic accident model database is shown in table 3.

TABLE 3

|  | Traffic scene | Vehicle behavior | Pedestrian behavior |
| --- | --- | --- | --- |
| Over speed accident | **south road, unblocked | Overtake by a vehicle | No pedestrian/No pedestrian drives through a red light |
| Serial rear-end accidents | **north road, unblocked | A vehicle is speeding/A safe distance between vehicles is less than 10 meters | No pedestrian/No pedestrian drives through a red light |
| Crossroad accident | **south road, unblocked | Vehicle across a road | Red light state, pedestrian cross the road |

The traffic accident model database shown in table 3 is merely an example. In table 3, the traffic accident model database corresponds to the traffic accident scenes one by one. Optionally, a same type of traffic accidents may correspond to multiple traffic accident scenes.

Step 2062: Match a feature of a traffic accident scene corresponding to each type of traffic accident against the feature of the traffic scene of the target area, and determine, based on a degree of matching between the features, a probability that the traffic scene becomes a traffic accident.

In an implementation, the degree of matching between the feature of the traffic accident scene corresponding to each type of traffic accident against the feature of the traffic scene of the target area determines the probability that the traffic scene becomes a traffic accident. Therefore, based on a proportional quantity relationship between the degree of matching and the accident probability, for example, the quantity relationship may use a proportional relationship, or use any curve having the foregoing single trend to describe.

Step 2063: Determine that the traffic scene of the target area will become a traffic accident scene with highest accident probability.

In an implementation, in the following situation, the highest accident probability is lower than a threshold of the accident probability, which shows that at a current moment, the probability that the traffic scene of the target area becomes a traffic accident scene is very low. Therefore, it is determined that the traffic scene of the target area will become a traffic accident scene with the highest accident probability and the accident probability is higher than the threshold of the accident probability, so as to ensure accuracy of the traffic accident warning. The threshold of the accident probability may be adjusted according to accuracy of warning fed back by a vehicle driver later. If the vehicle driver feeds back that the accuracy of warning is very low, a value of the threshold of the accident probability is relatively small, affecting the accuracy of warning. Therefore, the threshold of the accident probability should be adjusted to a higher level (according to a set extent) until the vehicle driver feeds back that the accuracy of warning reaches a practical standard.

Step 207: Send warning information to the vehicles in the target area when the cloud determines that a traffic accident scene is about to come.

In an implementation, when it is determined that the traffic scene of the target area will become a traffic accident scene, traffic accident warning corresponding to a type of the traffic accident scene is sent to a vehicle involved of the traffic accident scene in the target area, so as to prompt the driver to take care and avoid the traffic accident.

In another implementation, when it is determined that the traffic scene of the target area will become a traffic accident scene, a reason why the traffic accident happened to the vehicle involved according to the type of the traffic accident scene, for example, exceeding a speed limit and changing a lane. Driving prompt information is sent to the vehicle involved to instruct the vehicle to drive as prompted, for example, no speed exceeding, no changing the lane to prevent the traffic accident, to avoid the traffic accident scene.

To sum up, in the embodiments of this application, the traffic scene is determined according to the videos captured at the vehicle locations in the target area. The videos captured at the vehicles in the target area are synthesized to obtain the panoramic video of the target area, so that the vehicles in the target area are determined according to the panoramic video. The traffic scene of the vehicle locations in the target area is integrated to obtain the integrated traffic scene of the target area, so as to performing traffic accident prediction for the traffic scene of the target area by using a traffic accident model, thereby ensuring to warn related vehicles before the traffic accident happens, thus avoiding the traffic accident. The traffic accident prediction is aimed at an actual traffic scene of the vehicles in the target area, which is well-targeted and accurate, apparently reducing a rate of occurrence of the traffic accident.

When synthesizing the panoramic video of the target area, if vehicle traffic is light in the target area and synthesis of the panoramic video of the target area completely depends on the videos captured at the vehicles in the target area, an area of the target area cannot be fully covered because of a single capturing orientation and few captured videos, leading to a condition that the panoramic video of all areas of the target area cannot be synthesized.

Aiming at the foregoing condition, in an embodiment, the traffic scene feature library is further set, using videos in the traffic scene feature library as complement of using the mobile terminal to capture videos and synthesize the panoramic video. For example, the traffic scene feature library may include at least one of the following:

1) Use a Static Traffic Scene of the Target Area Extracted from the Videos Captured at the Vehicles For a target area, a static target is extracted from the videos captured at each vehicles in the target area, that is, a static target of the target area, for example, traffic signs such as a road, a bridge, a traffic light, a road lane, a road sign, a pole, and the like. A static traffic scene of the target area is synthesized based on the static target. The static traffic scene is used to iteratively update the static traffic scene to a video corresponding to the static traffic scene of the target area in the traffic scene feature library. As time goes by, the static traffic scene of the target area may be improved to cover all areas of the target area.

2) Use a Traffic Scene Extracted from a Surveillance Video Captured by a Third Party for the Target Area The surveillance video is captured by the third party, such as a surveillance video database of a traffic management department, for a particular monitoring area in the target area, such as a crossroad and a bridge. The static target is extracted from the surveillance video and the static target is used to synthesize the static traffic scene of the target area. The synthesized static traffic scene is iteratively updated to the traffic scene feature library.

Figure 10:
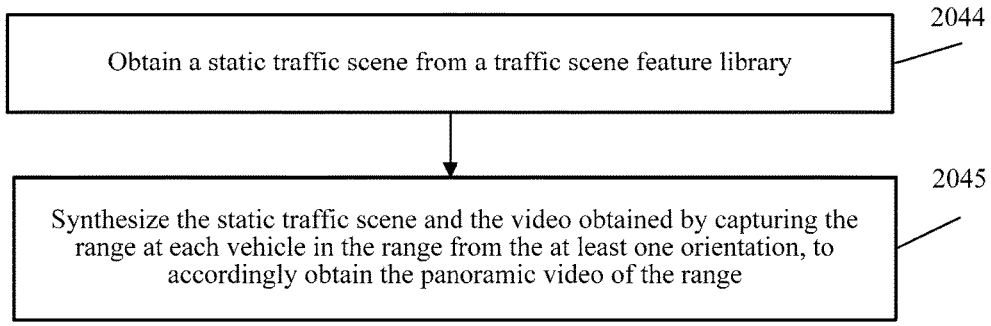
FIG. 10 is a schematic flowchart of an implementation of step 204 in FIG. 6 according to an embodiment of this application.

Referring to FIG. 10, FIG. 10 is an optional schematic flowchart of obtain a panoramic video of a target area by a cloud in step 204 shown in FIG. 6, including step 2044 to step 2045. The following describes the steps.

Step 2044: Obtain a static traffic scene from a traffic scene feature library.

In an embodiment, when vehicle traffic in the target area is lower than a threshold of the vehicle traffic, that is, it is determined that videos captured at vehicles in the target area at a current moment cannot fully synthesize a panoramic video of the target area, the static traffic scene is extracted from the traffic scene feature library.

Step 2045: Synthesize the static traffic scene of the target area obtained from the traffic scene feature library and the video obtained by capturing the target area at each vehicle in the target area from the at least one orientation, to accordingly obtain the panoramic video of the target area.

In an embodiment, a target feature of each video frame in the video captured at each vehicle in the target area and a target feature of each video frame in the video obtained from the traffic scene feature library are tagged and indexed. The video (including a video captured by a camera at a location of a mobile terminal in a target area and at least one type of video obtained from the traffic scene feature library) is searched based on a description of a target feature or based on a target feature displayed as a sample, to obtain video frames having an identical target feature and synthesize the video frames having an identical target feature.

In the video captured by the mobile terminal in the target area, a main driver constructs a dynamic traffic scene in the panoramic video. The static traffic scene obtained from the traffic scene feature library is mainly used to synthesize static scenery in the panoramic video, such as buildings, which complements each other to fully synthesize the panoramic video of the target area, so as to accurately determine an integrated traffic scene of the target area, thus ensuring accuracy of using a traffic accident model to perform traffic accident prediction on the traffic scene of the target area.

Figure 11:
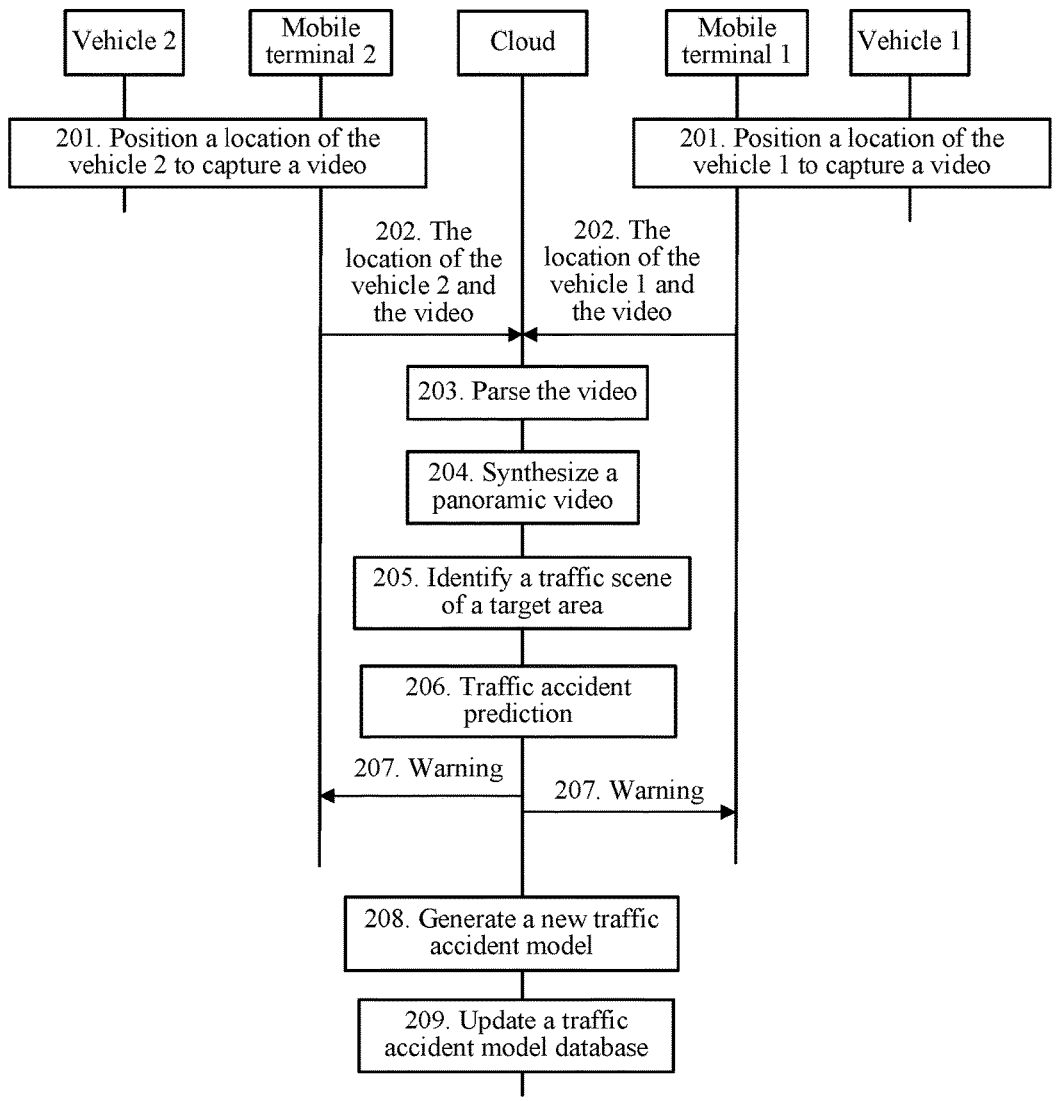
FIG. 11 is a schematic flowchart of a traffic accident warning method according to an embodiment of this application.

In an embodiment, to automatically update the traffic accident model in the traffic accident model database in a process of traffic accident prediction and to perform full and accurate determination on various traffic accident scenes. FIG. 11 shows an optional schematic flowchart of a traffic accident warning method based on FIG. 6, further including the following steps:

Step 208: Generate a new traffic accident model based on the traffic scene of the target area and a correspondence of a traffic accident type corresponding to the traffic accident scene with highest accident probability.

Step 209: The cloud iteratively updates the traffic accident model database by using the new traffic accident model.

For a newly predicted traffic accident scene each time, the new traffic accident scene and a corresponding traffic accident type form the new traffic accident model and are updated to a traffic accident model feature database in an accumulation manner. The traffic accident model in the traffic accident model database follows continuously updating traffic accident scenes in the target area to implement self-adaptation study without manually updating the traffic accident model. With prediction on traffic accidents in the target area, accuracy of using the traffic accident model database to perform traffic accident prediction is becoming higher, thus ensuring accuracy of prediction of the traffic accident model.

In some embodiments, a traffic accident warning method is performed at a computing device having one or more processors and memory storing a plurality of programs to be executed by the one or more processors. The method comprises obtaining (1) location data of a first vehicle and a second vehicle respectively, and (2) videos captured by a first video camera onboard the first vehicle and a second video camera onboard the second vehicle as the first vehicle and the second vehicle move on a road. A respective video comprises a plurality of video frames captured during a time period. In some embodiments, the captured videos are real-time videos. In some embodiments, the location data may be retrieved from GPSs of respective vehicles, or obtained from image recognition based on the imaged captured by the video cameras. In some embodiments, the video camera is a 360-degree camera that captures a panorama view.

In some embodiments, the method further comprising processing the captured videos to obtain (a) road status data (b) vehicle motion data of one or more vehicles and (c) pedestrian motion data of one or more pedestrians present within fields of view of the first and second video cameras at respective time points within the time period. In some embodiments, the videos are processed using methods includes image recognition, object identification, object classification, etc. In some embodiments, the road status data related to road status of one or more cross sections at where a plurality of vehicles travel towards directions that intersect with and/or opposite to each other, or where there is high collision risk. In some embodiments, the road status data includes road potholes, cracks, sags and humps, traffic light malfunction, traffic-rules violations, road blockers, unknown barriers or objects on the road. In some embodiments, the vehicle traveling data includes information related to speed, direction, acceleration, signal lights to indicate changing lanes or taking turns, whether violating traffic rules, etc. In some embodiments, the pedestrian motion data includes information related to speed, direction, if making turns, whether in precautious state (checking phones while walking . . . ), whether a high risk group (disabled, young children, slow-walking elderly people, etc.), whether violating traffic rules (jay-walking), etc.

In some embodiments, the method further comprises generating one or more traffic scenes associated with one or more areas including the first and second vehicles on the road within the time period. A traffic scene of a respective area includes video data synthesized based on the road status data, the vehicle motion data, the pedestrian motion data, and broadcasted traffic data associated with the respective area and from a plurality of viewing angles. In some embodiments, the traffic scenes are generated based on footage from a plurality of video cameras, including video cameras onboard a plurality of vehicles (including the first and the second vehicles), surveillance cameras on signal lights, or surveillance cameras on street stores that cover road footage, etc. In some embodiments, a traffic scene is a panorama view at the respective location. In some embodiments, the traffic scenes are created for cross sections, other points of interest, or other high-risk areas selected by the user.

In some embodiments, the method further comprises generating one or more traffic accident models based on past traffic accidents and (a) road status data (b) vehicle motion data and (c) pedestrian motion data associated with the past traffic accidents. In some embodiments, these data are obtained from videos captured by a plurality of video cameras in the past when those traffic accidents happened, including video cameras onboard a plurality of vehicles near the accident scene, surveillance cameras on signal lights, or on street stores that cover road footage near the accident scene.

In some embodiments, the method further comprises synthesizing a simulation video including one or more target features based on the traffic scenes and the traffic accident models at a target area associated with the target features. In some embodiments, the one or more target features are extracted from the (a) road status data (b) vehicle motion data and (c) pedestrian motion data from the captured videos. In some embodiments, the simulation videos are panorama views. For example, the target features may include one or more of: at a particular cross section, between 5:00-5:30 pm, a lot of cars and pedestrians going toward different directions, one car travelling at 15 mph above the speed limit of this road, or one car runs a red light. These target features can be used to search from the generated traffic scenes and to be applied to the traffic accident models to evaluate the similarity between these scenarios.

In some embodiments, the method further comprises performing traffic accident prediction based on the simulation videos and sending warning information to the first vehicle in accordance with a determination that the first vehicle is about have an accident in the target area. In some embodiments, the target features and the data from the related traffic scenes may be applied to the traffic accident models to calculate a risk score indicating how likely one or more cars in the target area will run into traffic accident. In some embodiments, the target area is an area that the first vehicle is in, or is about to enter, or is planning to enter on the route. In some embodiments, the computing device further sends warning information to the second vehicle or to one or more other vehicles that are predicated to be involved in the predicted accident.

In some embodiments, the above discussed method is performed at a computing device located on a cloud computing system that is in communication with the first vehicle and the second vehicle, as shown in FIG. 1. In some embodiments, the method is performed at a first computing device (e.g., a mobile device or an in-vehicle computing system) onboard the first vehicle. The first computing device is in communication (e.g., Wifi, Bluetooth, satellite communication, radio frequency communication, etc.) with a second computing device (e.g., a mobile device or an in-vehicle computing system) onboard the second vehicle.

Figure 12:
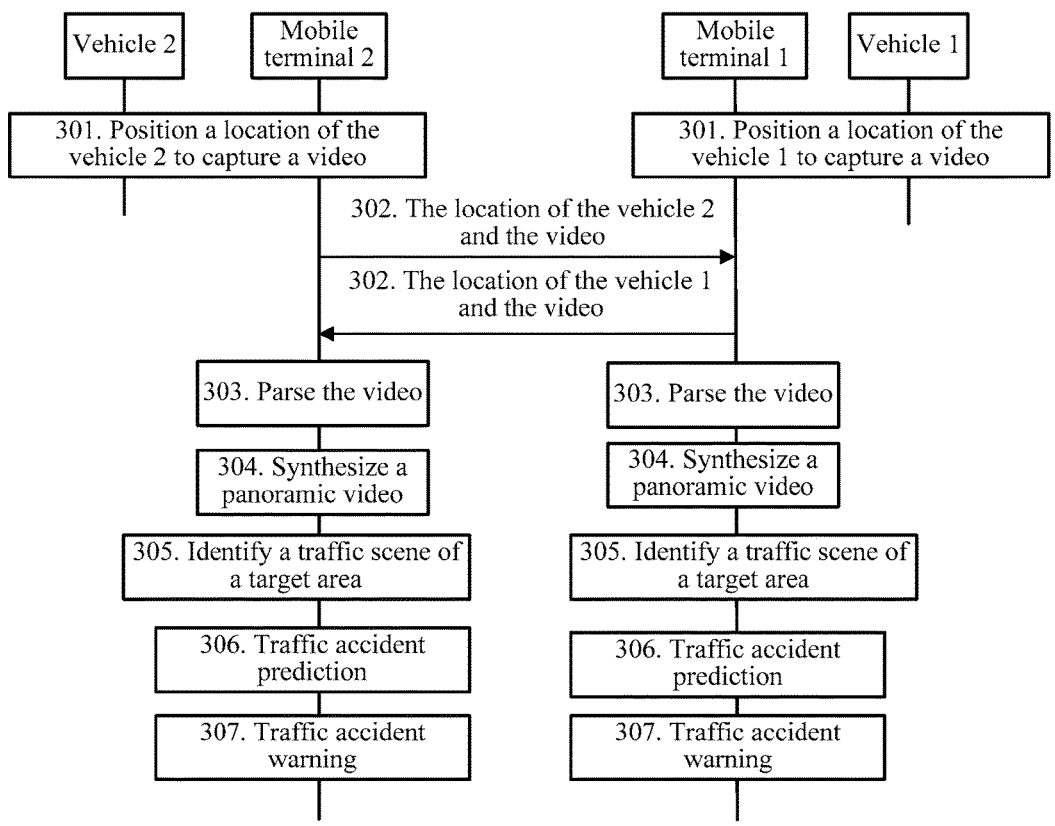
FIG. 12 is a schematic flowchart of a traffic accident warning method according to an embodiment of this application.

The following refers to FIG. 12, when a traffic accident warning apparatus is a mobile terminal, traffic accident warning in a target area is described. Traffic accident warning in multiple target areas may be implemented with reference to the following recorded technical solutions. Different from the foregoing embodiment, traffic accident warning processing shown in FIG. 12 is merely completed together by the mobile terminal without a cloud.

FIG. 12 is a schematic flowchart of a traffic accident warning method provided according to an embodiment of this application, including step 301 to step 307. The following describes with reference to steps:

Step 301: Each mobile terminal on a vehicle in a target area positions vehicle locations and videos are obtained by capturing the vehicle locations in the target area from at least one orientation.

As described above, the vehicle locations use an original geographic coordinate or a geographic square coordinate. Alternatively, in an implementation, information of different target areas can be preset in the mobile terminal. A positioning service is opened among mobile terminals so that any mobile terminal can obtain real-time locations of other mobile terminals in the target area.

Step 302: Each mobile terminal in the target area sends the vehicle locations and the captured videos to other mobile terminals.

Because the captured videos needs to be sent to other mobile terminals in the target area in the following, given that different mobile terminals have different data processing abilities, the mobile terminals can send the captured videos after compressing the captured video, so as to ensure that all mobile terminals can have enough space to receive videos and perform processing.

Step 303: The mobile terminals in the target area process the captured videos to obtain a traffic scene of the vehicle locations in the target area.

Example 1): In an implementation, each vehicle in the target area processes the captured videos and the videos sent by other mobile terminals, to obtain a traffic scene of locations of each mobile terminal in the target area. The mobile terminals process the videos to obtain the traffic scene of the locations in the target area, which may be implemented with reference to that the cloud processes the captured videos to obtain a traffic scene of each of the vehicle locations in the target area.

Example 2): In another implementation, the vehicles in the target area perform ability negotiation to determine at least one mobile terminal with a highest processing ability in the target area as a node of the target area. All the videos captured at the vehicles in the target area are processed to obtain the traffic scene of the vehicle locations in the target area.

Step 304: Each mobile terminal in the target area synthesizes the video obtained by capturing the target area at each vehicle from the at least one orientation in the target area, to accordingly obtain a panoramic video of the target area.

Further describe the Example 1): Each mobile terminal in the target area performs panoramic synthesis based on the captured video and the received video. Panoramic video synthesis may be implemented with reference to a record of synthesizing the panoramic video by the cloud.

Further describe the Example 2): The mobile terminals as the node in the target area synthesize the panoramic video based on the captured video and the received video.

Step 305: The mobile terminals in the target area identify vehicles in a target area in the panoramic video, and synthesize traffic scenes of areas of each vehicle in the target area to obtain a traffic scene of the target area.

Further describe the Example 1): In an implementation, each mobile terminal in the target area identifies vehicles in a target area in the panoramic video, and synthesizes traffic scenes of areas of each vehicle in the target area to obtain a traffic scene of the target area. Similarly, identification of the traffic scene of the target area may be implemented with reference to a record of identifying the target area by the cloud.

Further describe the Example 2): In another implementation, the mobile terminals as the node in the target area identify vehicles in a target area in the panoramic video, and synthesize traffic scenes of areas of each vehicle in the target area to obtain a traffic scene of the target area.

Step 306: The mobile terminals in the target area determine whether the traffic scene of the target area will become a traffic accident scene.

Further describe the Example 1): In an implementation, each mobile terminal in the target area determines whether the traffic scene of the target area will become a traffic accident scene. Similarly, determination of whether the traffic scene of the target area will become a traffic accident scene may be implemented with reference to a record of determining whether the traffic scene of the target area will become a traffic accident scene by the cloud.

Further describe the Example 2): In an implementation, the mobile terminals as the node in the target area determine whether the traffic scene of the target area will become a traffic accident scene.

Step 307: Send warning information to the vehicles in the target area when the mobile terminals in the target area determine that a traffic accident scene is about to come.

For example, for any mobile terminal, when determining that an area of the mobile terminal will become a traffic accident scene, the mobile terminal sends warning and sends warning to mobile terminals in other vehicles involved in the traffic accident.

Figure 13:
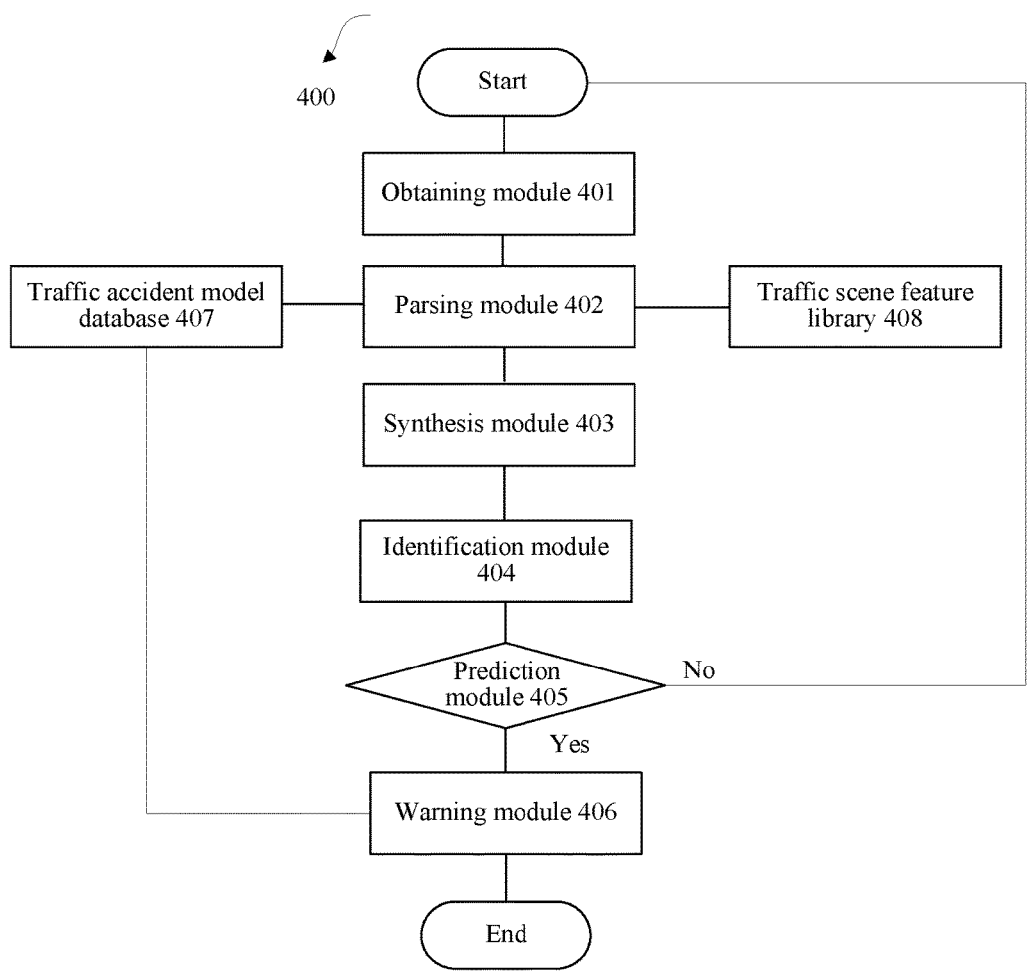
FIG. 13 is a schematic structural diagram of a logical function of a traffic accident warning apparatus according to an embodiment of this application.

The following further describes a structure of the traffic accident warning apparatus, refer to a schematic structural diagram of the traffic accident warning apparatus 400 according to an embodiment of this application shown in FIG. 13, including: an obtaining module 401, a processing module 402, a synthesis module 403, an identification module 404, a prediction module 405, and a warning module 406. The traffic accident warning apparatus 400 may further include a traffic accident model database 407 and a traffic scene feature library 408. The following describes the modules.

The obtaining module 401 is configured to obtain locations of a plurality of vehicles in a target area and a video obtained by capturing the target area at each of the vehicle locations from at least one orientation.

In an implementation, when the traffic accident warning apparatus 400 is implemented as a mobile terminal, the obtaining module 401 includes a positioning unit and a capturing unit. The positioning unit can be implemented by a positioning module 103 shown in FIG. 3. The positioning module 103 receives a global positioning module (GPS) signal or a BeiDou positioning signal to position the vehicle. The vehicle locations use the original geographic coordinate and a square coordinate. The capturing unit is configured to capture the target area at each of the vehicle locations from the at least one orientation to obtain the videos. In actual applications, the capturing unit can be implemented by a camera 106 shown in FIG. 3. The capturing unit can be a camera, or implemented as modules constructed by multiple cameras 106 to perform full-orientation video capturing. In addition, the capturing unit can further integrate a cloud apparatus to adjust a capturing orientation of the cameras 106. For example, the capturing unit is disposed at a top of the vehicle, so as to enlarge the captured view angle to the largest degree.

The processing module 402 is configured to process the captured videos to obtain a traffic scene of each of the vehicle locations in the target area.

In some embodiments of the traffic scene obtained by processing the videos, the processing module 402 performs target extraction in the video captured by each vehicle to obtain at least one of the following targets: a road, a vehicle, a pedestrian, and a traffic light; and performs mode identification on the extracted target to obtain at least one of the following features: a road scene of the road, a behavior type of the pedestrian, a behavior type of the vehicle, and a status of the traffic light.

The synthesizing module 403 synthesizes the video obtained by capturing the target area at each vehicle from the at least one orientation in the target area, to accordingly obtain a panoramic video of the target area.

The identification module 404 is configured to identify vehicles in a target area in the panoramic video, and synthesize traffic scenes of areas of each vehicle in the target area to obtain a traffic scene of the target area.

In some embodiments of synthesizing based on the traffic scene of each vehicle in the target area, the synthesis module 403 tags and indexes a target feature of each video frame in the video captured at each vehicle in the target area, searches the video based on a description of a target feature or based on a target feature displayed as a sample, to obtain video frames having an identical target feature, and synthesizes the video frames that are obtained by searching having an identical target feature.

The prediction module 405 determines whether the traffic scene of the target area will become a traffic accident scene.

In some embodiments of determining whether the traffic scene of the target area will become a traffic accident scene, the prediction module 405 extracts a feature of a traffic accident scene corresponding to each type of traffic accident in a traffic accident model database 407. The traffic accident model database includes: a correspondence between traffic accident scenes and traffic accident types; matching a feature of a traffic accident scene corresponding to each type of traffic accident in a traffic accident model database against the feature of the traffic scene of the target area; and determining, based on a degree of matching between the features, a probability that the traffic scene of the target area becomes a traffic accident determining that the traffic scene of the target area will become a traffic accident scene with highest accident probability.

The warning module 406 sends warning information to the vehicles in the target area when the prediction module 405 determines that a traffic accident scene is about to come.

For example, the warning module 406 executes at least one of the following operations: sending a type of traffic accident warning corresponding to the traffic accident scene to a vehicle involved in the traffic accident scene in the target area; and sending driving prompt information to the vehicle involved in the traffic accident scene in the target area, to instruct the vehicle to drive as prompted, to avoid the traffic accident scene.

It needs to be noted that the processing module 402, the synthesis module 403, the identification module 404, the prediction module 405, and the warning module 406 is a division in a logical function layer of the traffic accident warning apparatus. Any module can be jointed to implement, or any module can be divided into multiple modules to implement. The processing module 402, the synthesis module 403, the identification module 404, the prediction module 405, and the warning module 406 can be implemented by a processor 101 shown in FIG. 3 by executing executable instructions stored in a memory 105.

In an embodiment, to ensure that the synthesized panoramic video can cover all areas of the target area, the processing module 402 extracts a static target from the video captured at each of the vehicle locations, synthesizes a static traffic scene of the target area based on the static target, and iteratively updates the static traffic scene to the static traffic scene of the target area in the traffic scene feature library 406, or obtains a video captured by a third party for a particular monitoring area in the target area from a third-party surveillance video database, the surveillance video being updated to the static traffic scene of the target area in the traffic scene feature library 406. Accordingly, the synthesis module further configured to obtain at least one of the following from the traffic scene feature library: a video captured by a third party for a particular monitoring area in the target area; a video corresponding to the static traffic scene of the target area; and at least one type of video obtained from the traffic scene feature library and a video obtained by capturing the target area at each vehicle from the at least one orientation in the target area, to obtain a panoramic video of the target area. The video of the static scene in the traffic scene feature library to make up a difference of a static scene in the video captured by the vehicles to ensure that the synthesized panoramic video includes an integrated traffic scene.

In an embodiment, to automatically update the traffic accident model in the traffic accident model database in a process of traffic accident prediction and to perform full and accurate determination on various traffic accident scenes, the warning module 406 is further configured to generate a new traffic accident model based on the traffic scene of the target area and a traffic accident type model corresponding to the traffic scene of the target area; and iteratively update the traffic accident model database by using the new traffic accident model.

Figure 14:
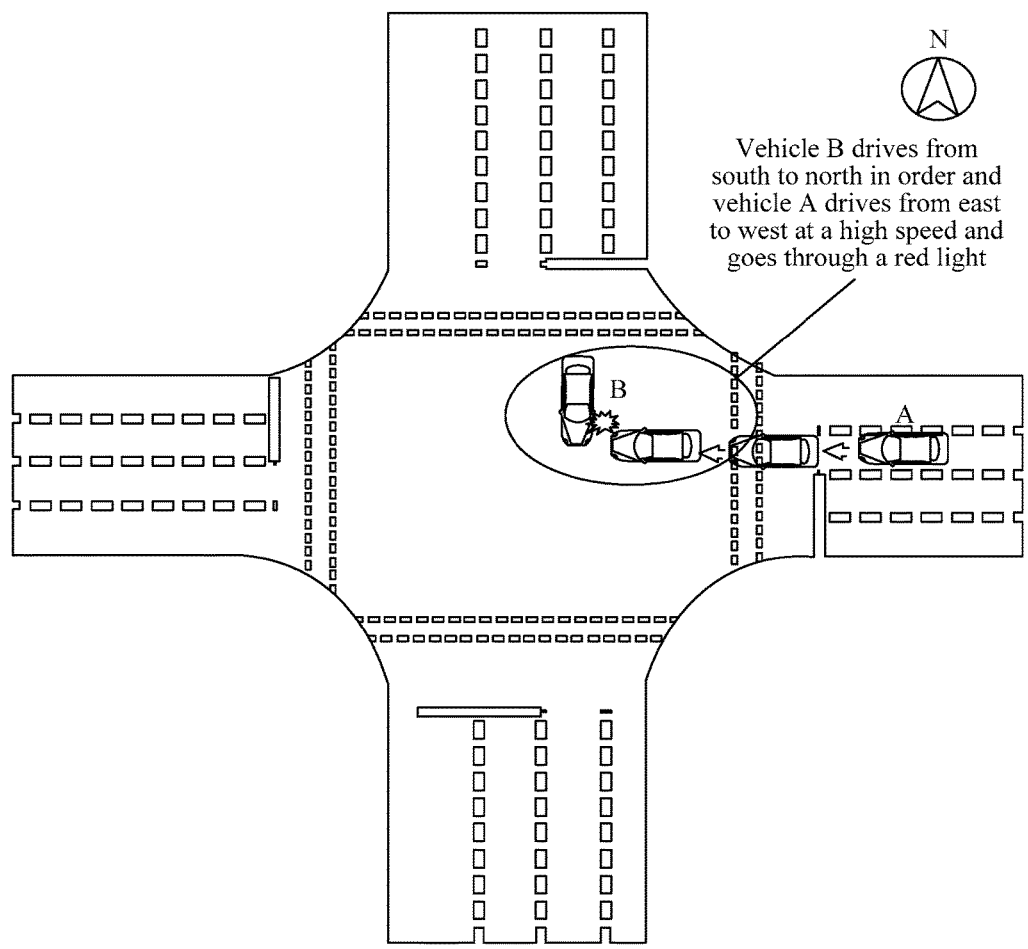
FIG. 14 is a schematic diagram of a traffic accident scene according to an embodiment of this application.

The following further describes with reference to an example shown in FIG. 14. FIG. 14 shows an optional schematic diagram of a target area in a target area. Use that a target area is a crossroad as an example. In the target area, vehicle B drives from north to south at north of a crossroad and vehicle A drives from east to west at a high speed at east of the crossroad. Because of limited view, drivers of vehicle A and vehicle B cannot feel each other. Once vehicle A goes through a red light, vehicle A will crash on vehicle B.

Based on the solution provided in the embodiments of this application, a mobile terminal disposed in vehicle A and vehicle B captures videos and positions the vehicle locations. The cloud synthesizes a panoramic video according to videos and locations uploaded by the mobile terminal disposed in vehicle A and vehicle B. When synthesizing the panoramic video, a video of the cross road can be synthesized with reference to the traffic scene feature library, so as to synthesize an integrated panoramic video of the traffic scene at the crossroad at a current moment.

Figure 4B:
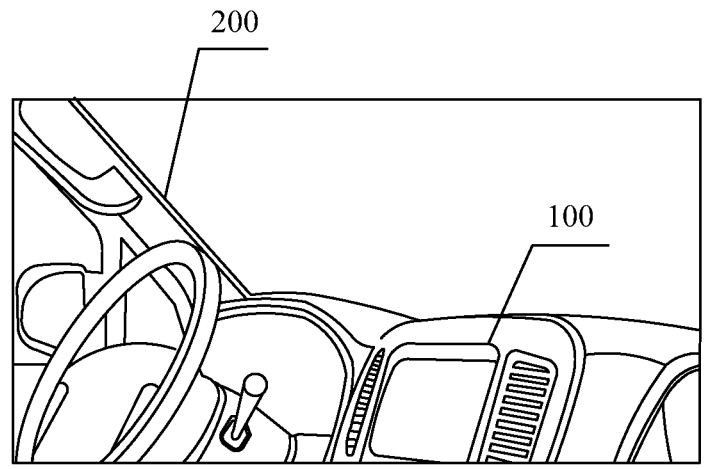
FIG. 4B is a schematic diagram of an in-vehicle mobile terminal according to another embodiment of this application.

The traffic scene at the crossroad processed from the panoramic video by the cloud is shown in FIG. 4:

TABLE 4

|  | Traffic scene | Vehicle behavior | Pedestrian behavior |
| --- | --- | --- | --- |
| Vehicle B | **north road, north is unblocked | Cross a crossroad | No pedestrian |
| Vehicle A | **east road, east and west are unblocked | Drive through a red light | No pedestrian |

The traffic accident model in the traffic accident model database is used to perform traffic accident prediction based on the panoramic video and a traffic accident module that two vehicles crash at the crossroad is matched as shown in table 5.

TABLE 5

|  | Traffic scene | Vehicle behavior | Pedestrian behavior |
| --- | --- | --- | --- |
| Crash accident at a crossroad | Un-blocked | A vehicle goes through a red light at a first direction and A vehicle is crossing a crossroad at a second direction and | No pedestrian/no pedestrian drives through a red light |

Figure 15:
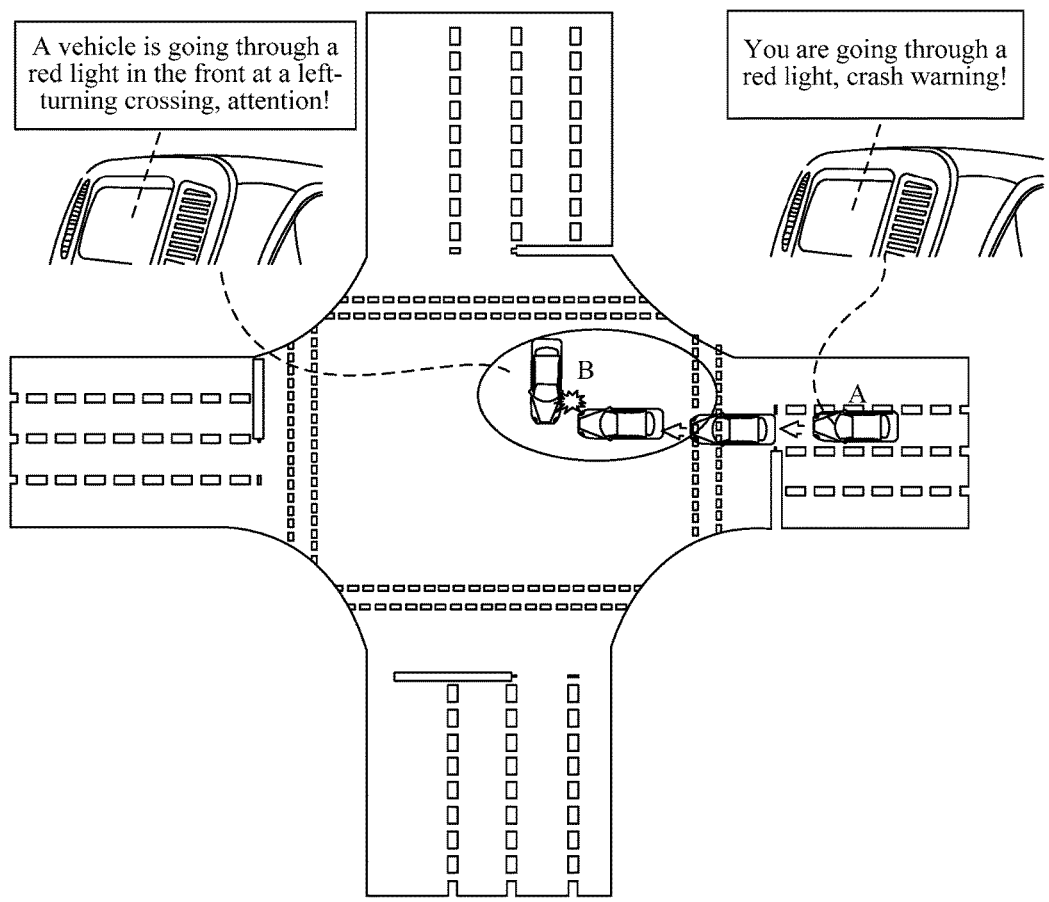
FIG. 15 is a schematic diagram of traffic accident warning according to an embodiment of this application.

It is predicted that vehicle A will crash into B because vehicle A goes through the red light, so that warning is sent in real time to vehicle A and vehicle B to avoid an accident. For example, the mobile terminal can display prompt information on a display screen and send ZigBee prompt as shown in FIG. 15: prompting a driver of vehicle A of crashing for going through the red light and prompting a driver of vehicle B to avoid crashing into A going through the red light.

An embodiment of this application further provides a computer storage medium, storing executable instructions, the executable instructions being used to execute the traffic accident warning method.

To sum up, in the embodiments of this application, the panoramic video of the target area is synthesized by obtaining a real-time video of the vehicle locations in the target area, and a real-time traffic scene of the target area is accurately determined based on the panoramic video, so as to performing traffic accident prediction for the traffic scene of the target area by using a traffic accident model, thereby ensuring to warn related vehicles before the traffic accident happens, thus avoiding the traffic accident. The traffic accident prediction is aimed at an actual traffic scene (that is, a driving condition) of the vehicles in the target area, which is well-targeted and accurate, apparently reducing a rate of occurrence of the traffic accident.

In the embodiments of this application, if implemented in the form of software functional modules and sold or used as independent products, the integrated modules may be stored in a computer-readable storage medium. Based on such an understanding, persons skilled in the technology should understand that the embodiments of this application may be provided as methods, systems, or computer program products. Therefore, this application may take the form of total hardware embodiments, total software embodiments, or embodiments combining software and hardware. In addition, this application may use a form of a computer program product implemented on one or more computer available storage media including computer available program code. The storage media include, but are not limited to a U disk, a mobile hard disk, a read-only memory (ROM), a random access memory (RAM), a disk memory, a compact disc read-only memory (CD-ROM), an optical memory, and the like.

This application is described with reference to flowcharts and/or block diagrams of the method, the device (the system), and the computer program product in the embodiments of this application. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may further be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments of this application have been described, once persons skilled in the technology know a basic creative concept, they can make other changes and modifications to these embodiments. Therefore, the following claims are intended to cover the embodiments and all changes and modifications falling within the scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A traffic accident warning method performed at a computing device having one or more processors and memory storing a plurality of programs to be executed by the one or more processors, the method comprising:
    obtaining (1) location data of a first vehicle and a second vehicle respectively, and (2) videos captured by a first video camera onboard the first vehicle and a second video camera onboard the second vehicle as the first vehicle and the second vehicle move on a road, wherein a respective video comprises a plurality of video frames captured during a time period;
    processing the captured videos to obtain (a) road status data (b) vehicle motion data of one or more vehicles and (c) pedestrian motion data of one or more pedestrians present within fields of view of the first and second video cameras at respective time points within the time period;
    generating one or more traffic scenes associated with one or more areas including the first and second vehicles on the road within the time period, wherein a traffic scene of a respective area includes video data synthesized based on the road status data, the vehicle motion data, the pedestrian motion data, and broadcasted traffic data associated with the respective area and from a plurality of viewing angles;
    generating one or more traffic accident models based on past traffic accidents and the (a) road status data (b) vehicle motion data and (c) pedestrian motion data associated with the past traffic accidents;
    synthesizing a simulation video including one or more target features and based on the traffic scenes and the traffic accident models at a target area associated with the target features, wherein the one or more target features are extracted from the (a) road status data (b) vehicle motion data and (c) pedestrian motion data from the captured videos; and
    performing traffic accident prediction based on the simulation videos and sending warning information to the first vehicle in accordance with a determination that the first vehicle is about have an accident in the target area.

2. The method according to claim 1, wherein the processing the captured videos comprises:
    performing target extraction in the video captured at each of vehicle locations to obtain at least one of the following targets: a road, a vehicle, a pedestrian, and a traffic sign; and
    performing mode identification on the extracted target to obtain at least one of the following features: a road scene of the road, a behavior type of the pedestrian, a behavior type of the vehicle, and a status of the traffic sign.

3. The method according to claim 1, wherein the synthesizing the one or more simulation videos comprises:
obtaining a static traffic scene of a target area associated with the first vehicle from a traffic scene feature library; and
synthesizing the obtained static traffic scene of the target area and the video obtained by capturing the target area at each of vehicle locations from the plurality of viewing angles, to obtain the panoramic video of the target area.

4. The method according to claim 3, wherein the method further comprises:
extracting a static target from the video captured at each of the vehicle locations, synthesizing a static traffic scene of the target area based on the static target, and iteratively updating the static traffic scene to the traffic scene feature library; and/or
obtaining a surveillance video from a third-party surveillance video database, synthesizing a static traffic scene of the target area based on the static target extracted from the surveillance video, and iteratively updating the synthesized static traffic scene to the traffic scene feature library, the surveillance video being a video captured by a third party for a particular monitoring area in the target area.

5. The method according to claim 1, wherein the synthesizing the one or more simulation videos comprises:
tagging and indexing a target feature of each video frame in the videos captured at each of the vehicle locations;
searching the videos based on a description of a target feature or based on a target feature displayed as a sample, to obtain video frames having an identical target feature; and
synthesizing the video frames having an identical target feature.

6. The method according to claim 1, wherein the performing traffic accident prediction comprises:
matching a target feature of a traffic accident scene corresponding to each type of traffic accident in a traffic accident model database against the feature of the traffic scene of the target area, and determining, based on a degree of matching between the features, a probability that the traffic scene of the target area becomes a traffic accident, the traffic accident model database comprising a correspondence between traffic accident scenes and traffic accident types; and
determining that the traffic scene of the target area will become a traffic accident scene with a highest accident probability.

7. The method according to claim 6, wherein a new traffic accident model is generated based on the traffic scene of the target area and a traffic accident type corresponding to the traffic scene of the target area; and
wherein the method further comprises: iteratively updating the traffic accident model database by using the new traffic accident model.

8. The method according to claim 1, wherein the sending the warning information comprises executing at least one of the following operations:
sending a type of traffic accident warning corresponding to the traffic accident scene to a vehicle involved in a traffic accident scene in the target area; and
sending driving prompt information to the vehicle involved in the traffic accident scene in the target area, to instruct the vehicle to drive as prompted, to avoid the traffic accident scene.

9. The method according to claim 1, wherein the method is performed at a computing device in communication with the first vehicle and the second vehicle.

10. The method according to claim 1, wherein the method is performed at a first computing device onboard the first vehicle, the first computing device in communication with a second computing device onboard the second vehicle.

11. A computing device for generating traffic accident warnings, comprising one or more processors and memory storing a plurality of programs, wherein the plurality of programs, when executed by the one or more processors, cause the computing device to perform the following operations:
obtaining (1) location data of a first vehicle and a second vehicle respectively, and (2) videos captured by a first video camera onboard the first vehicle and a second video camera onboard the second vehicle as the first vehicle and the second vehicle move on a road, wherein a respective video comprises a plurality of video frames captured during a time period;
processing the captured videos to obtain (a) road status data (b) vehicle motion data of one or more vehicles and (c) pedestrian motion data of one or more pedestrians present within fields of view of the first and second video cameras at respective time points within the time period;
generating one or more traffic scenes associated with one or more areas including the first and second vehicles on the road within the time period, wherein a traffic scene of a respective area includes video data synthesized based on the road status data, the vehicle motion data, the pedestrian motion data, and broadcasted traffic data associated with the respective area and from a plurality of viewing angles;
generating one or more traffic accident models based on past traffic accidents and the (a) road status data (b) vehicle motion data and (c) pedestrian motion data associated with the past traffic accidents;
synthesizing a simulation video including one or more target features based on the traffic scenes and the traffic accident models at a target area associated with the target features, wherein the one or more target features are extracted from the (a) road status data (b) vehicle motion data and (c) pedestrian motion data from the captured videos; and
performing traffic accident prediction based on the simulation videos and sending warning information to the first vehicle in accordance with a determination that the first vehicle is about have an accident in the target area.

12. The computing device according to claim 11, wherein the computing device is onboard the first vehicle and in communication with another computing device onboard the second vehicle.

13. The computing device according to claim 11, wherein the computing device is located on a server system that is in communication with the first vehicle and the second vehicle.

14. The computing device according to claim 11, wherein the processing the captured videos comprises:
performing target extraction in the video captured at each of vehicle locations to obtain at least one of the following targets: a road, a vehicle, a pedestrian, and a traffic sign; and
performing mode identification on the extracted target to obtain at least one of the following features: a road scene of the road, a behavior type of the pedestrian, a behavior type of the vehicle, and a status of the traffic sign.

15. The computing device according to claim 11, wherein the synthesizing the one or more simulation videos comprises:
  obtaining a static traffic scene of a target area associated with the first vehicle from a traffic scene feature library; and
  synthesizing the obtained static traffic scene of the target area and the video obtained by capturing the target area at each of vehicle locations from the plurality of viewing angles, to obtain the panoramic video of the target area.

16. The computing device according to claim 11, wherein the performing traffic accident prediction comprises:
  matching a target feature of a traffic accident scene corresponding to each type of traffic accident in a traffic accident model database against the feature of the traffic scene of the target area, and determining, based on a degree of matching between the features, a probability that the traffic scene of the target area becomes a traffic accident, the traffic accident model database comprising a correspondence between traffic accident scenes and traffic accident types; and
  determining that the traffic scene of the target area will become a traffic accident scene with a highest accident probability.

17. The computing device according to claim 11, wherein the sending the warning information comprises executing at least one of the following operations:
  sending a type of traffic accident warning corresponding to the traffic accident scene to a vehicle involved in a traffic accident scene in the target area; and
  sending driving prompt information to the vehicle involved in the traffic accident scene in the target area, to instruct the vehicle to drive as prompted, to avoid the traffic accident scene.

18. A non-transitory computer readable storage medium storing a plurality of programs in connection with a computing device having one or more processors, wherein the plurality of programs, when executed by the one or more processors, cause the computing device to perform the following operations:
  obtaining (1) location data of a first vehicle and a second vehicle respectively, and (2) videos captured by a first video camera onboard the first vehicle and a second video camera onboard the second vehicle as the first vehicle and the second vehicle move on a road, wherein a respective video comprises a plurality of video frames captured during a time period;
  processing the captured videos to obtain (a) road status data (b) vehicle motion data of one or more vehicles and (c) pedestrian motion data of one or more pedestrians present within fields of view of the first and second video cameras at respective time points within the time period;
  generating one or more traffic scenes associated with one or more areas including the first and second vehicles on the road within the time period, wherein a traffic scene of a respective area includes video data synthesized based on the road status data, the vehicle motion data, the pedestrian motion data, and broadcasted traffic data associated with the respective area and from a plurality of viewing angles;
  generating one or more traffic accident models based on past traffic accidents and the (a) road status data (b) vehicle motion data and (c) pedestrian motion data associated with the past traffic accidents;
  synthesizing a simulation video including one or more target features based on the traffic scenes and the traffic accident models at a target area associated with the target features, wherein the one or more target features are extracted from the (a) road status data (b) vehicle motion data and (c) pedestrian motion data from the captured videos; and
  performing traffic accident prediction based on the simulation videos and sending warning information to the first vehicle in accordance with a determination that the first vehicle is about have an accident in the target area.

19. The non-transitory computer readable storage medium according to claim 18, wherein the processing the captured videos comprises:
  performing target extraction in the video captured at each of vehicle locations to obtain at least one of the following targets: a road, a vehicle, a pedestrian, and a traffic sign; and
  performing mode identification on the extracted target to obtain at least one of the following features: a road scene of the road, a behavior type of the pedestrian, a behavior type of the vehicle, and a status of the traffic sign.

20. The non-transitory computer readable storage medium according to claim 18, wherein the synthesizing the one or more simulation videos comprises:
  obtaining a static traffic scene of a target area associated with the first vehicle from a traffic scene feature library; and
  synthesizing the obtained static traffic scene of the target area and the video obtained by capturing the target area at each of vehicle locations from the plurality of viewing angles, to obtain the panoramic video of the target area.

* * * * *